(12) United States Patent
Freeman et al.

(10) Patent No.: US 11,354,765 B2
(45) Date of Patent: Jun. 7, 2022

(54) COMPUTER APPLICATIONS THAT DETERMINE A PARCEL POSITION ERROR

(71) Applicant: United Parcel Service of America, Inc., Atlanta, GA (US)

(72) Inventors: Mallory Freeman, Atlanta, GA (US); Timothy Major, Atlanta, GA (US); David Wu, Atlanta, GA (US); Lauren Skorb, Atlanta, GA (US); Matthew Britton, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 17/085,817

(22) Filed: Oct. 30, 2020

(65) Prior Publication Data

US 2022/0138885 A1    May 5, 2022

(51) Int. Cl.
*G07B 15/02* (2011.01)
*G06Q 50/28* (2012.01)
*G06Q 10/06* (2012.01)
*G06K 19/07* (2006.01)
*G06K 7/10* (2006.01)

(52) U.S. Cl.
CPC ......... *G06Q 50/28* (2013.01); *G06K 7/10297* (2013.01); *G06K 19/0723* (2013.01); *G06Q 10/0631* (2013.01)

(58) Field of Classification Search
CPC .............. G06Q 50/28; G06Q 10/0631; G06K 7/10297; G06K 19/0723

USPC ......................................................... 235/384
See application file for complete search history.

(56) References Cited

U.S. PATENT DOCUMENTS

| | | | |
|---|---|---|---|
| 10,885,653 B2* | 1/2021 | Goja | G06T 7/62 |
| 10,956,853 B2* | 3/2021 | Arora | B64D 9/00 |
| 2007/0222674 A1 | 9/2007 | Tan et al. | |
| 2015/0205989 A1 | 7/2015 | Motley et al. | |
| 2017/0183158 A1* | 6/2017 | Zhu | B65G 1/0492 |
| 2017/0286907 A1* | 10/2017 | Rizkallah | G06Q 30/0635 |
| 2018/0094966 A1* | 4/2018 | Buether | B62D 53/068 |

FOREIGN PATENT DOCUMENTS

WO    2014/205273 A2    12/2014

OTHER PUBLICATIONS

International Search Report and Written Opinion received for PCT Patent Application No. PCT/US2021/054732, dated Jan. 14, 2022, 10 pages.
International Search Report and Written Opinion received for PCT Patent Application No. PCT/US2021/054747, dated Feb. 25, 2022, 13 pages.

* cited by examiner

*Primary Examiner* — Ahshik Kim
(74) *Attorney, Agent, or Firm* — Shook, Hardy & Bacon L.L.P.

(57) ABSTRACT

Methods and apparatus for determining a parcel position error based on a comparison of load data and configuration data are provided. Embodiments describe a number of methods of determining the parcel position error such as by determining a parcel path from the load data.

18 Claims, 11 Drawing Sheets

COMPUTER APPLICATIONS THAT DETERMINE A PARCEL POSITION ERROR

BACKGROUND

Geolocation technologies have been continually improving with the proliferation of mobile computing and location-aware technologies. These geolocation technologies typically determine an asset is present by receiving a scan of an object (a barcode). Each of these scans are typically stored as events, with inconsistent naming conventions that are not mapped to physical or logical locations. The scans, among other things, can be inaccurate or a scan may be missed by the geolocation technologies. Due to many of these problems, no analytical metrics can be determined. Typical analytical metrics are unable to determine inaccurate or missing scans which makes tracking the asset inaccurate and unsuccessful. As described in more detail herein, aspects improve these technologies and conventional solutions.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

In general, embodiments of the present invention provide methods, apparatus, systems, computing entities, and/or the like for determining a parcel position error.

In accordance with one aspect, a computer-implemented method for determining a parcel position error based on a comparison of load data and configuration data is provided. The method may include receiving a load data with positions of a tag on a parcel. The method may further include receiving a configuration data with positions of a plurality of tags on a plurality of parcels. A computer may determine the parcel position error based on comparing the load data to the configuration data. In some embodiments, the parcel position error is determined when the first set of positions area beyond a threshold from the second set of positions.

Some embodiments are directed to an apparatus with at least one processor, memory, and program code that may cause the processor to determine a parcel position error based on determining a parcel path exceeds a threshold. In some embodiments, the method comprises receiving a load data comprising a first set of positions of a tag associated with a first parcel, and receiving a configuration data comprising a plurality of parcel paths of a tag of a plurality of tags associated with a plurality of parcels. A parcel path may be determined based on the first set of positions. In some aspects, the parcel position error may be determined based on determining the parcel path exceeds a threshold when compared to the plurality of parcel paths.

Some embodiments are directed to a computer-implemented method of determining at least one parcel path of a parcel. In some embodiments, the method includes receiving a load data comprising a first set of positions of a tag on the parcel. The method may further include determining a load start node with a first initial position based on the load data. The method may include determining a first series of positions based on the first set of positions of the tag. Finally, the method may include determining at least one parcel path based on the first set of positions of the tag and the load start node.

BRIEF DESCRIPTION OF THE DRAWINGS

Figure 1:
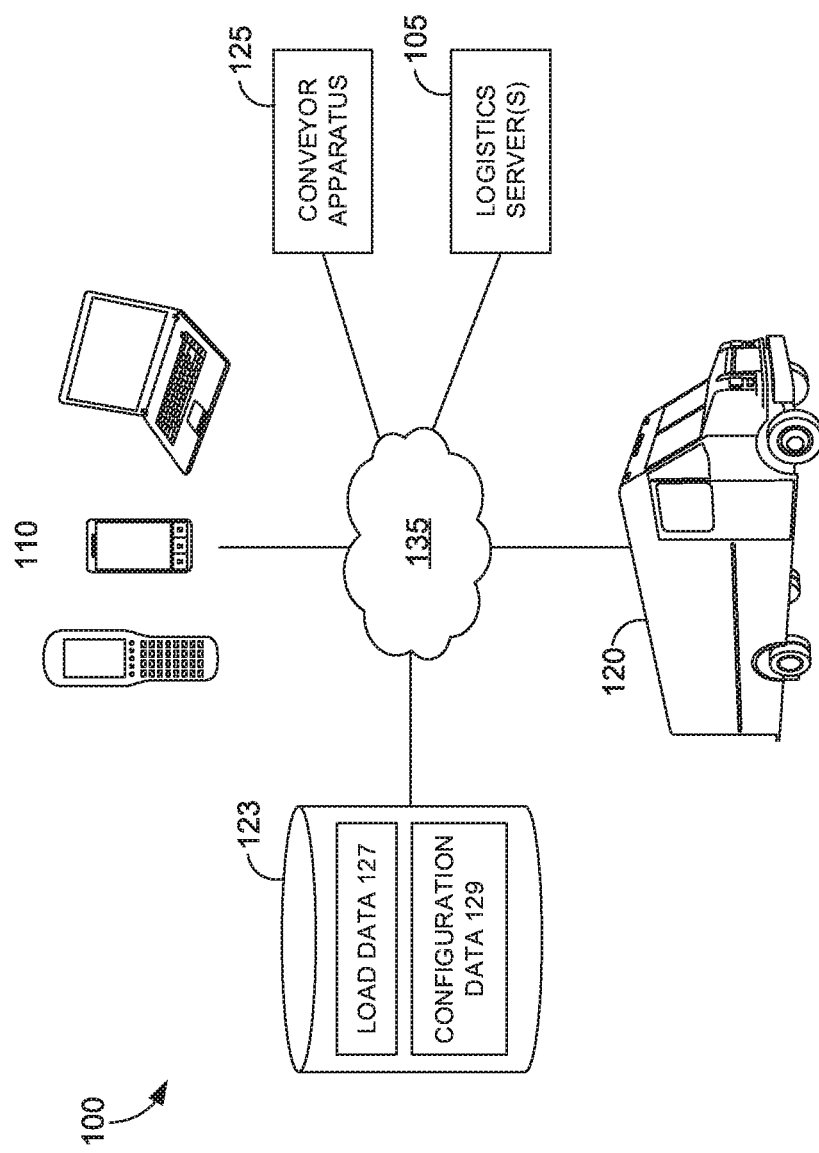

Having thus described the disclosure in general terms, reference will now be made to the accompanying drawings, which are not necessarily drawn to scale, and wherein:

FIG. 1 is a schematic diagram of an example computing environment in which aspects of the present disclosure are employed, according to some embodiments.

Figure 2:
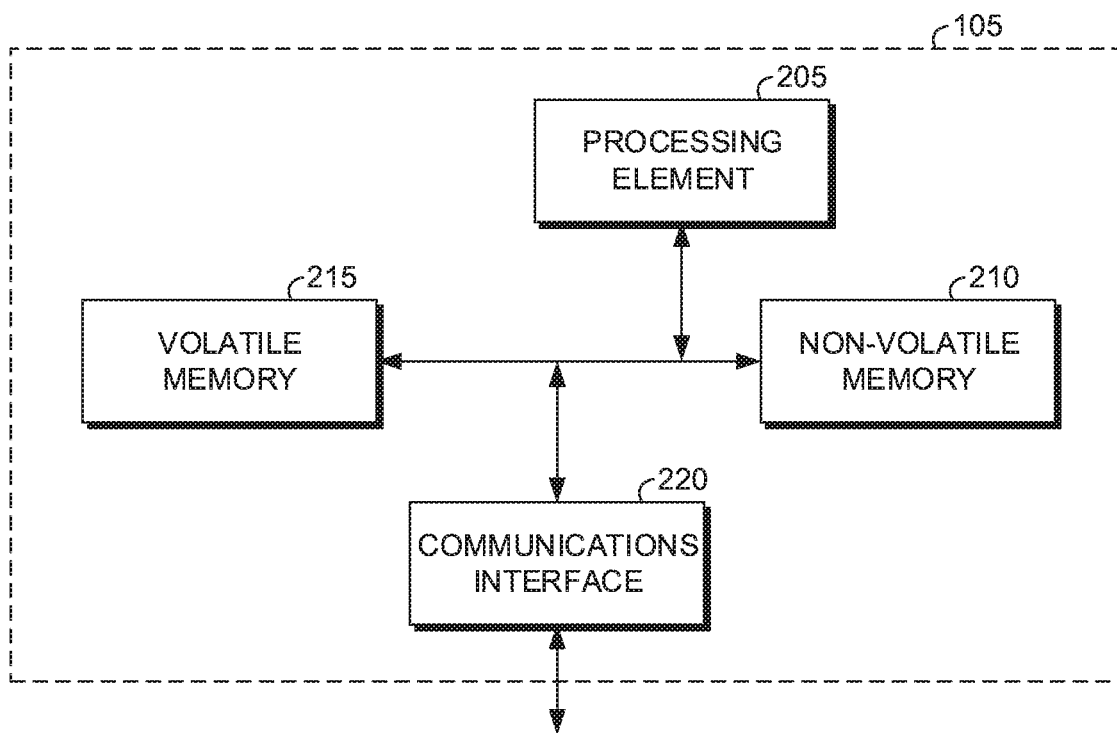

FIG. 2 is a schematic diagram of one or more logistics server(s) in which aspects of the present disclosure are employed, according to some embodiments.

Figure 3:
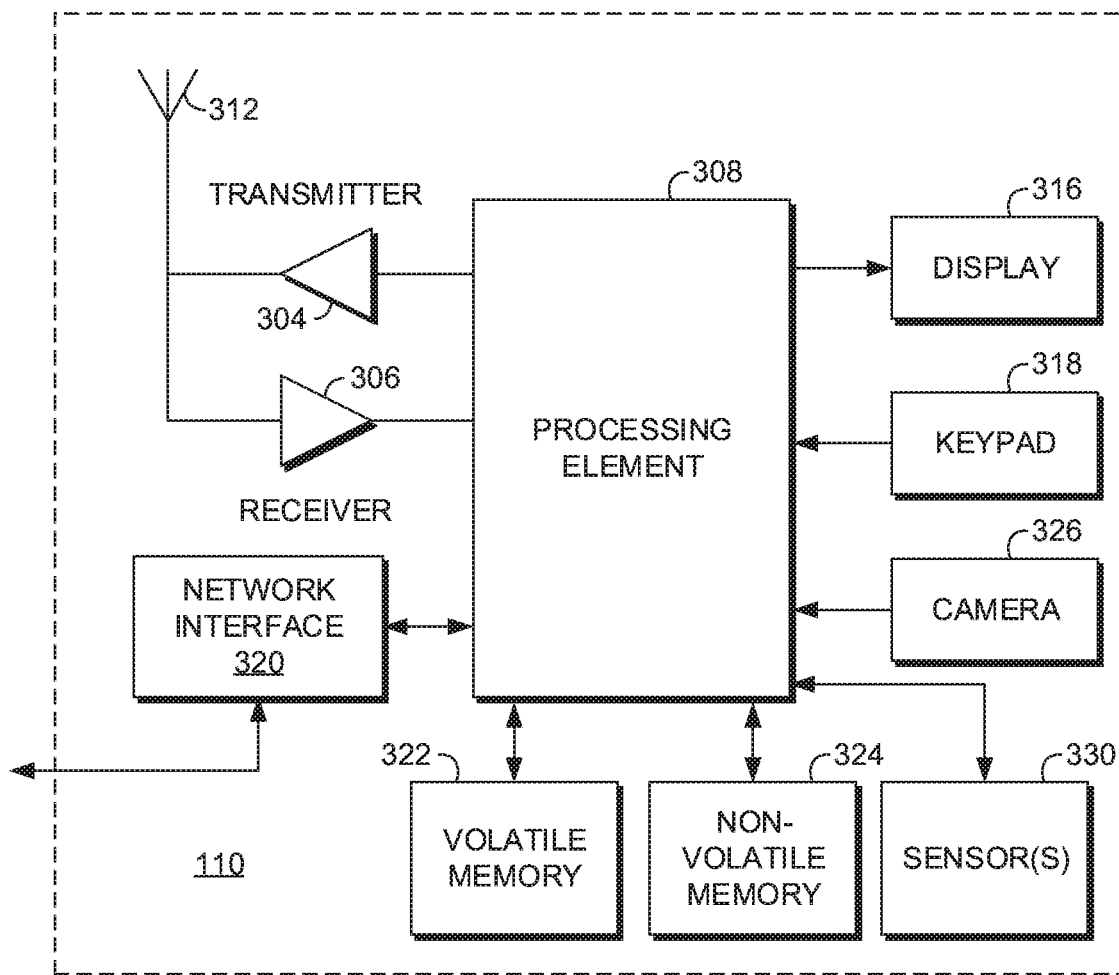

FIG. 3 is a schematic diagram of a computing entity in which aspects of the present disclosure are employed, according to some embodiments.

Figure 4A:
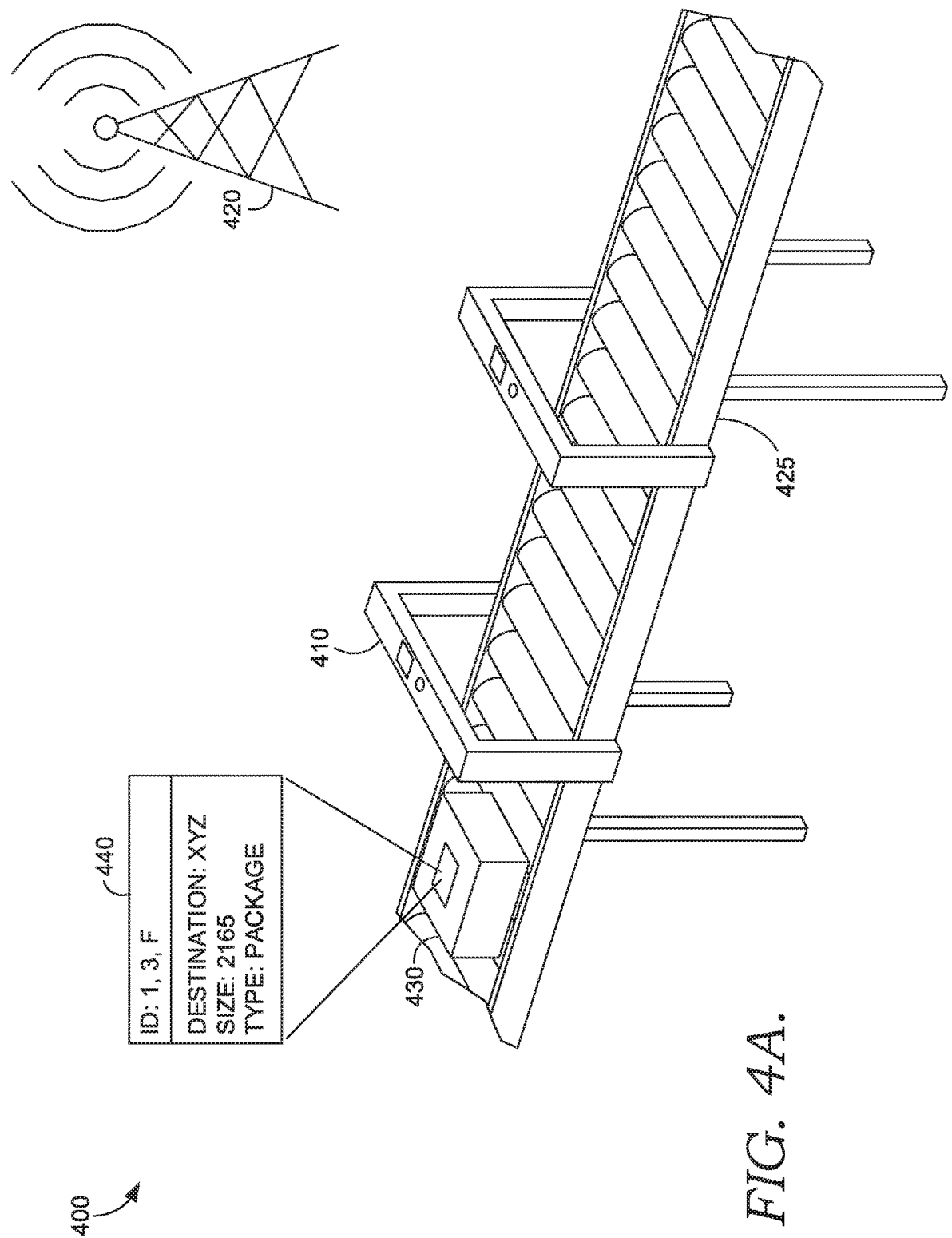
Figure 4B:
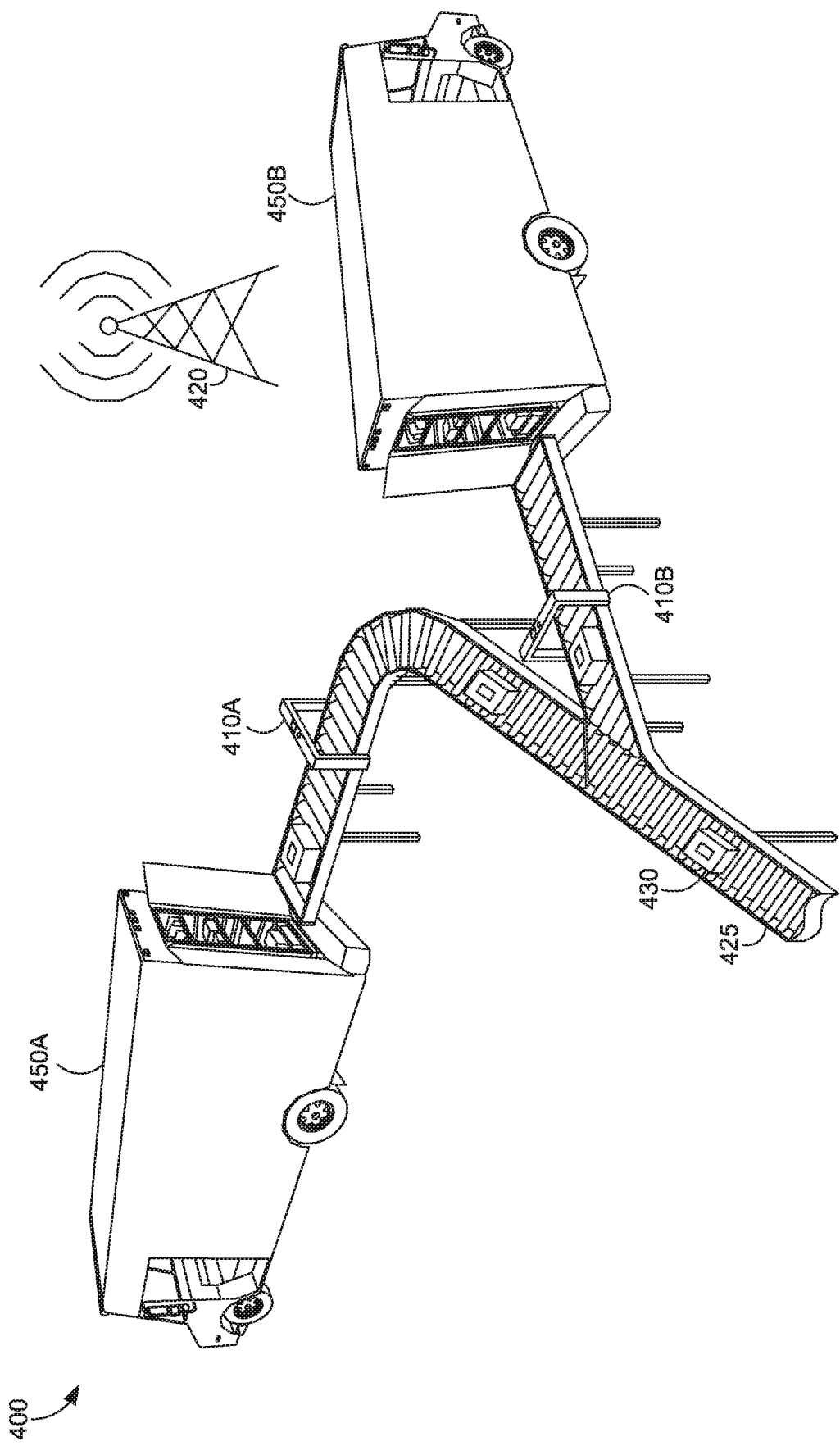

FIGS. 4A and 4B are schematic diagrams of an environment illustrating how one or more positions may be determined, according to some embodiment.

Figure 5:
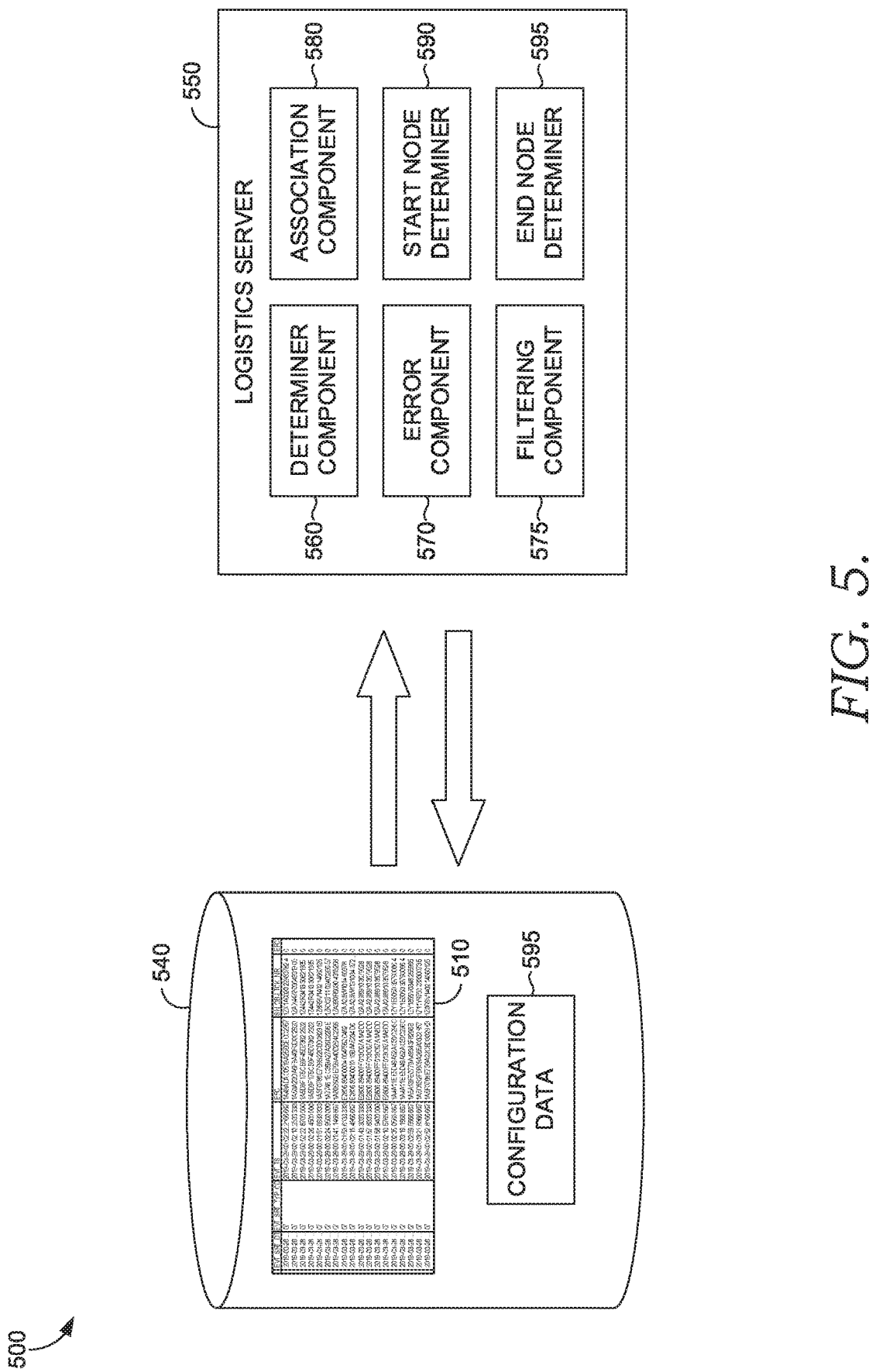

FIG. 5 is a schematic diagram of an example process for determining parcel position errors, according to some embodiments.

Figure 6:
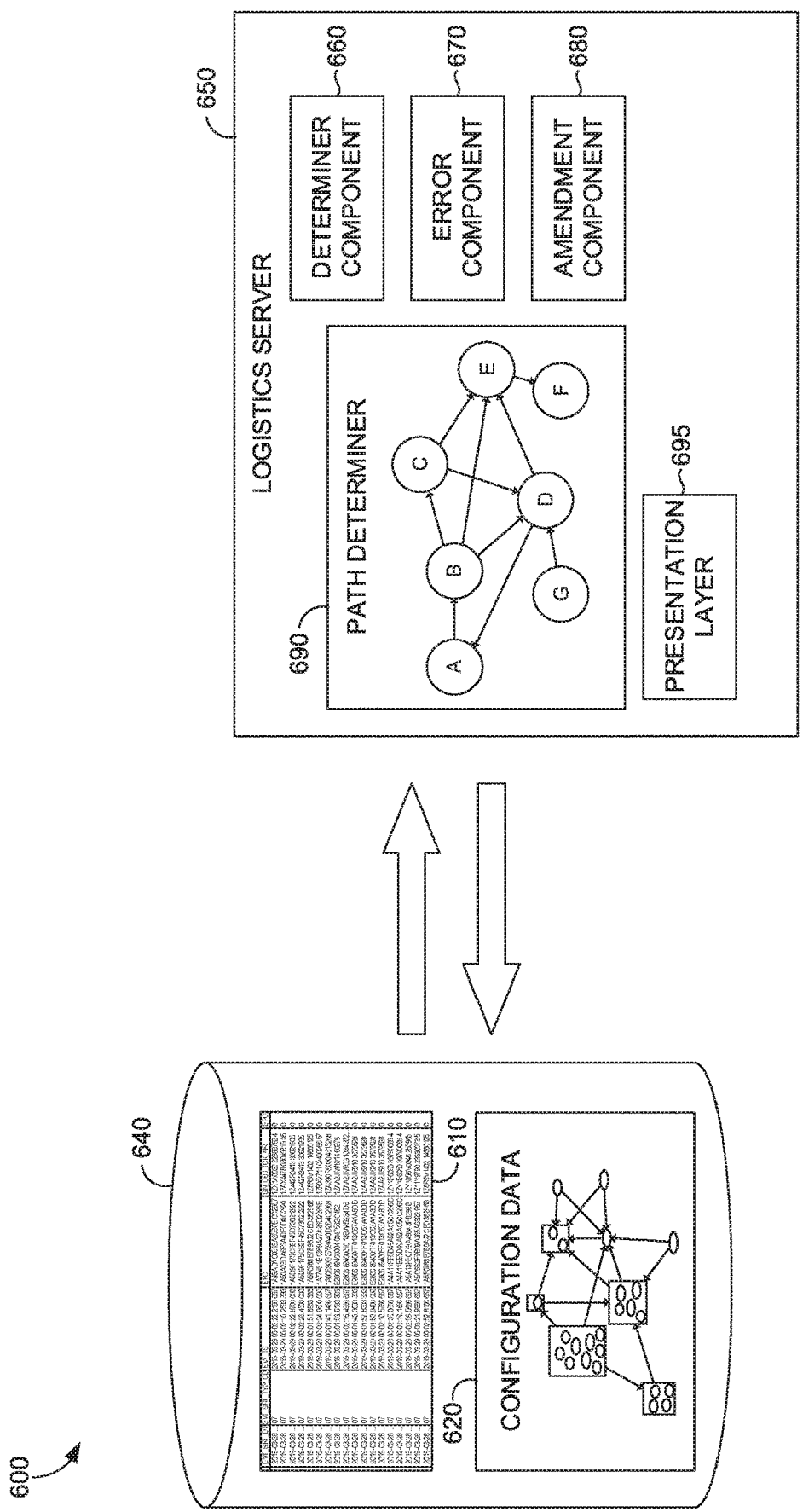

FIG. 6 is another schematic diagram of an example process for determining parcel position errors, according to some embodiments.

Figure 7:
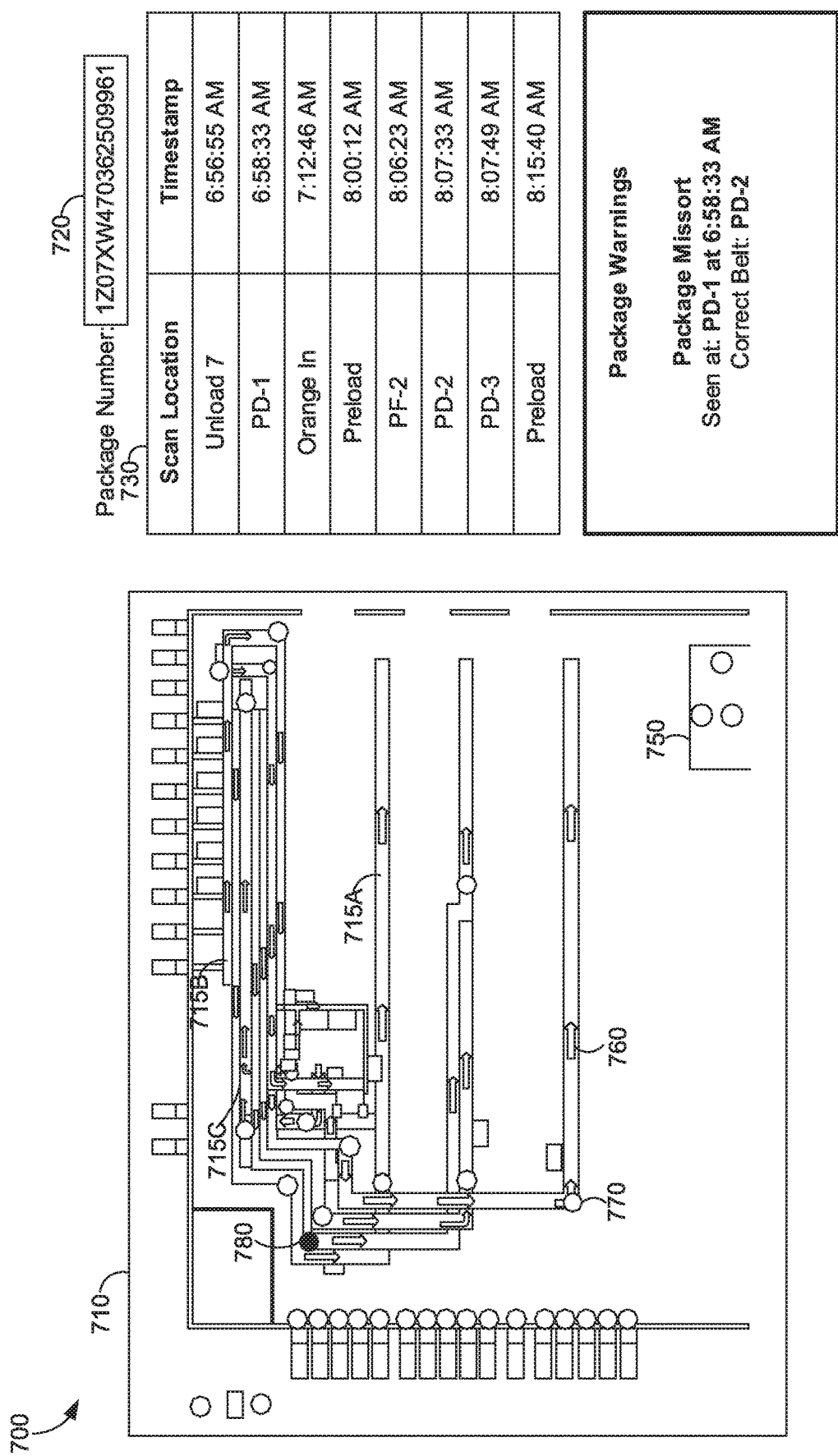

FIG. 7 is an schematic diagram of the parcel path on a graphical user interface, according to some embodiments.

Figure 8:
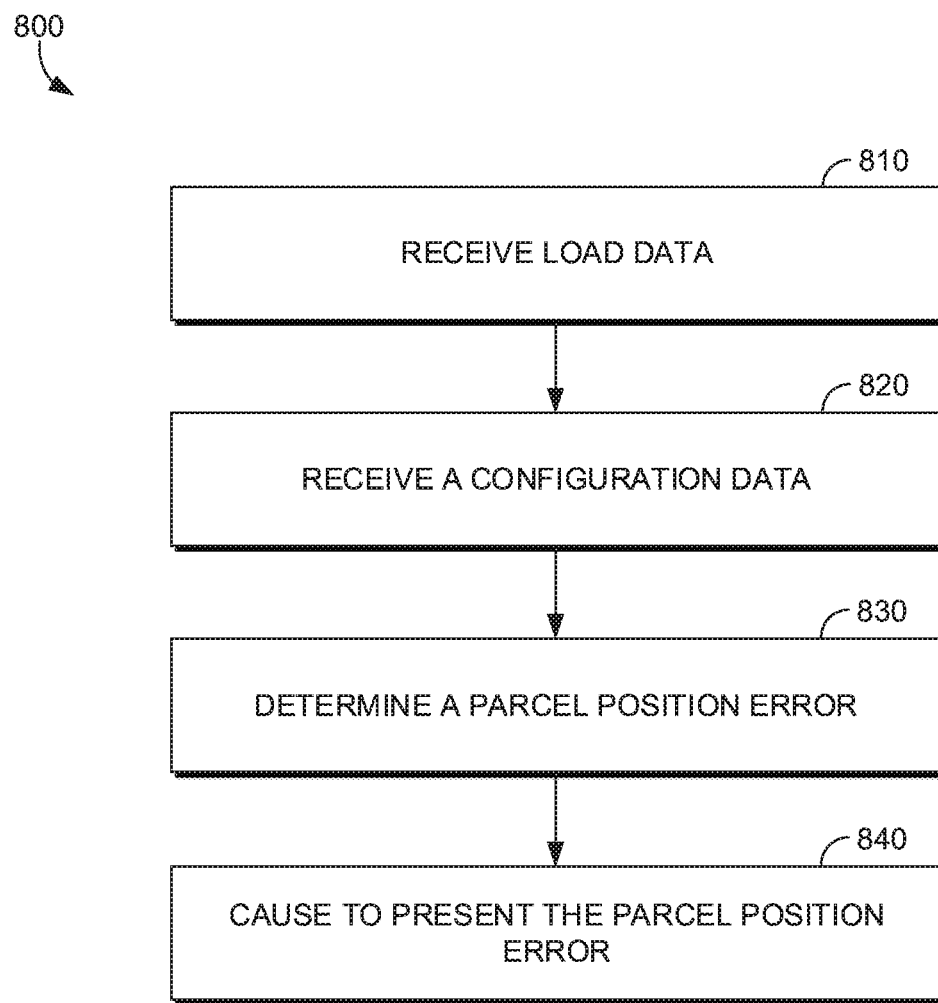

FIG. 8 is a flow diagram of an example method of determining a parcel position error, according to some embodiments.

Figure 9:
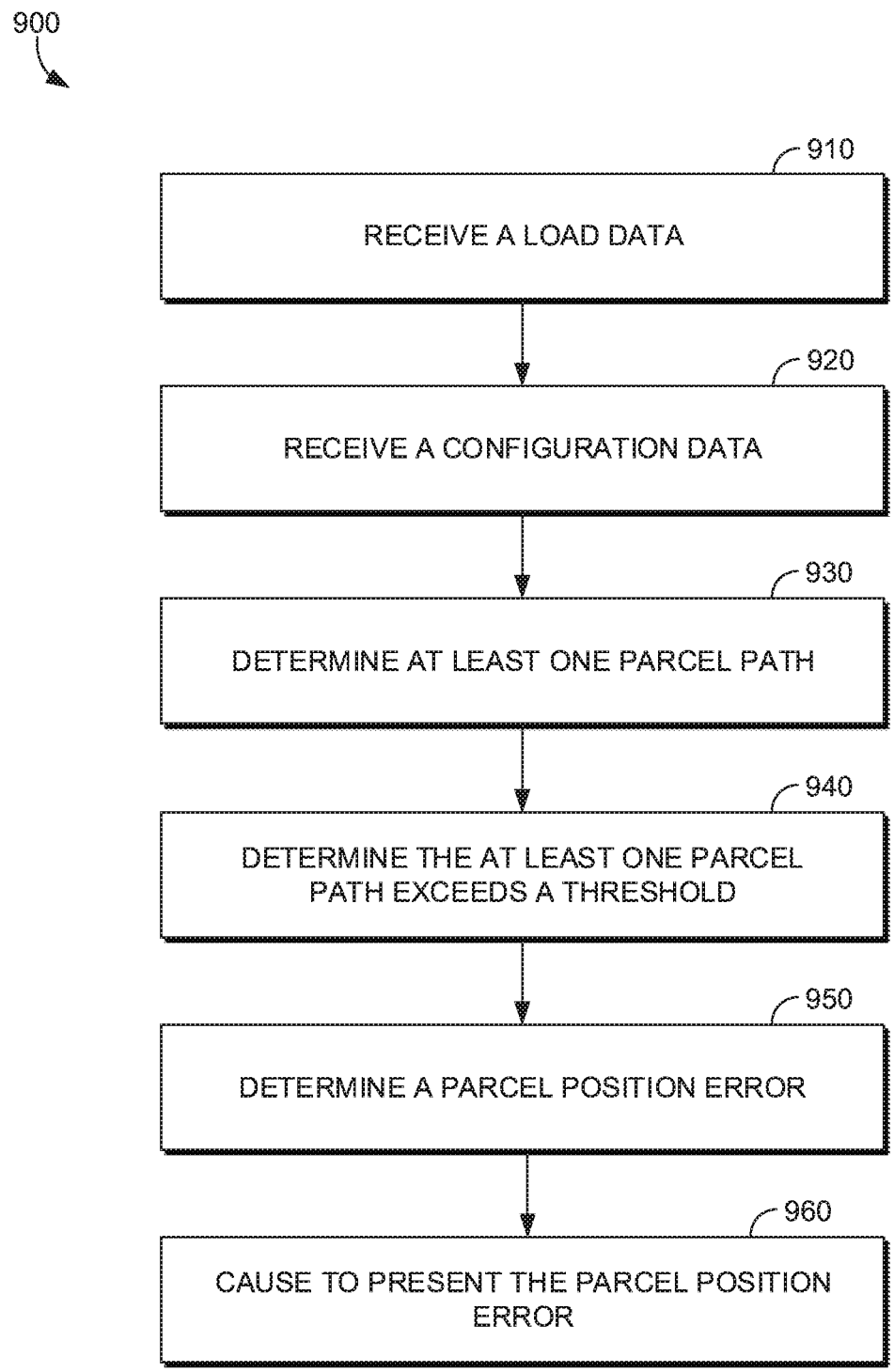

FIG. 9 is a flow diagram of an example method of determining a parcel position error, according to some embodiments.

Figure 10:
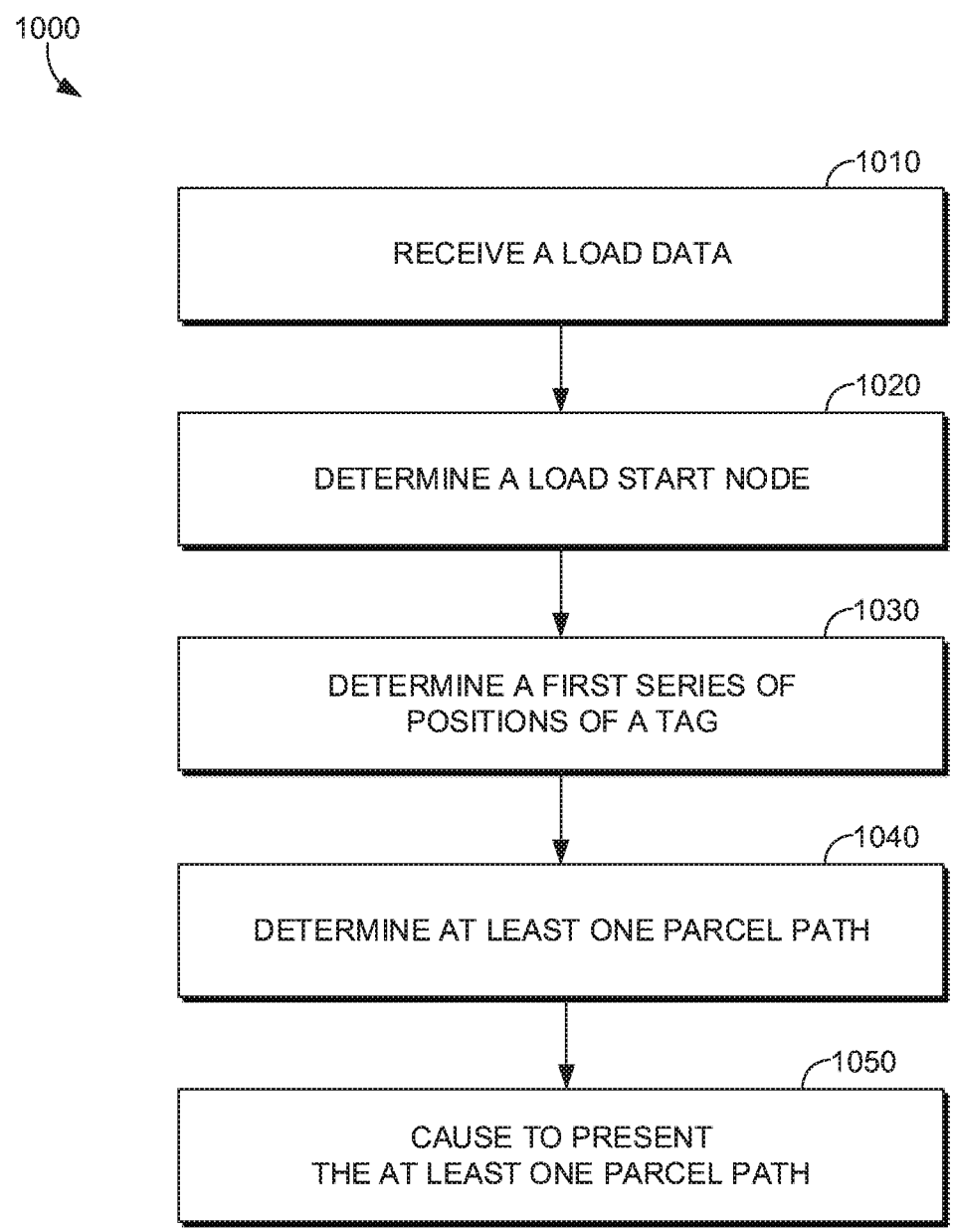

FIG. 10 is another flow diagram of an example method of determining at least one parcel path, according to some embodiments.

DETAILED DESCRIPTION OF THE INVENTION

The present disclosure will now be described more fully hereinafter with reference to the accompanying drawings, in which some, but not all embodiments of the disclosure are shown. The disclosure may be embodied in many different forms and should not be construed as limited to the embodiments set forth herein. Rather, these embodiments are provided so that this disclosure will satisfy applicable legal requirements.

I. Overview

As described above, existing geolocation technologies typically determine an asset is present by receiving a scan of an object, however these scans can have inconsistent naming conventions that are not mapped to physical or logical locations. The scans of typical geolocation technologies can be inaccurate or a scan may be missing. Due to many of these problems, no analytical metrics can be used to track the asset.

As an example, existing geolocation technologies in environments such as a sorting facility of a parcel, do not map any recorded data (e.g., scans of parcels) to physical and logical locations. This recorded data can only be stored as events instead of parcel paths. In these existing geolocation technologies, an issue with the parcel being mis-sorted can only be determined by a human operator noticing a parcel is not at a proper location, for example, by reading a parcel label, or noticing a parcel has fallen off the conveyer apparatus. Various embodiments improve these existing geolocation technologies by determining erroneous scans and by determining a parcel's path as described herein. These embodiments, among others described herein, compare a load data to a configuration data to determine the error.

Various embodiments of the present disclosure improve geolocation technologies in applications such as sorting facilities by enabling error detection and parcel path determination for a parcel. In various instances, this error detection and parcel path determination allows for even further functionality that improves existing technologies. For example, a conveyer apparatus may include a plurality of reader components (an "environmental sensor") that reads a tag coupled to a parcel. As each parcel traverses along the conveyer apparatus, each reader component reads the tag, receiving data recording the event such as a scan event. The scan event may be stored as load data. This load data may be compared to a configuration data that may include a plurality of expected or average reads for the load data. Based on the comparison, a parcel position error may be determined if the load data is beyond a threshold. In some aspects, for example, the load data may be beyond the threshold. The load data may be beyond the threshold when the load data is significantly different than the configuration data. For example, the load data may be different from the configuration data by a factor of two. In some examples, the parcel may have fallen off of the conveyer apparatus, or be miss-sorted. By comparison, geolocation technologies in applications such as sorting facilities may rely on a manual process (e.g., a human seeing a package on the floor of the facility) to determine if a parcel has fallen off the conveyer apparatus. Systems and methods provided herein, however, can determine parcel position errors automatically.

In some embodiments a parcel path may be determined based on the load data. In some aspects, the parcel path can be a route of the parcel along the conveyer apparatus. In embodiments where the parcel path is determined, the configuration data may include a plurality of parcel paths, for example, for a plurality of reference parcels. In these embodiments, a parcel position error may be determined based on the parcel path exceeding a threshold when compared to the plurality of parcel paths. Accordingly, geolocation technologies in applications like sorting facilities are enabled to detect errors and determine a parcel path for a parcel. Implementing a parcel path when determining a parcel position error can be beneficial. Some benefits of determining the parcel path include editing the parcel path when an error is detected, so the parcel path more accurately reflects the true path the parcel in the sorting facility.

Embodiments described herein improve geolocation technologies by determining load start positions defining an initial position of a parcel in the sorting facility. Similarly, a load end node may be determined in some embodiments defining the final position in the sorting facility for the parcel. From the load start and/or load end node a parcel path may be determined more accurately. The load start and/or load end nodes may also be used when determining a parcel position error and compared to a configuration start and/or configuration end node respectively. In this way, parcel position errors and parcel paths can be more accurately determined based on the load data.

It is understood that although this overview section describes various improvements to conventional solutions and technologies, these are by way of example only. As such, other improvements may be described or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, object code, byte code, compiled code, interpreted code, machine code, and/or the like (also referred to herein as executable instructions, instructions for execution, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to flow diagrams and flowchart illustrations. Thus, it should be understood that each block of the flow diagrams and flowchart illustrations may be implemented in the form of a computer program product, an entirely hardware embodiment, a combination of hardware and computer program products, and/or apparatuses, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the flow diagrams and flowchart illustrations. Accordingly, the flow diagrams and flowchart illustrations support various combinations of embodiments for performing the specified instructions, operations, or steps.

III. Exemplary System Architecture

FIG. 1 is a schematic diagram of an example computing environment 100 in which aspects of the present disclosure are employed, according to some embodiments. As shown in FIG. 1, this particular computing environment 100 includes one or more logistics vehicles 120, one or more logistics servers 105, one or more computing entities 110 (e.g., a mobile device, such as a DIAD), one or more satellites (not shown), one or more networks 135, a plurality of storage units 123, and a conveyor apparatus 125. In some aspects, as illustrated, the load data 127 and configuration data 129 may be stored in the storage units 123. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture.

In various embodiments, the network(s) 135 represents or includes an IoT (internet of things) or IoE (internet of everything) network, which is a network of interconnected items (e.g., the storage units 123 and the conveyor apparatus 125) that are each provided with unique identifiers (e.g., UIDs) and computing logic so as to communicate or transfer data with each other or other components. Such communication can happen without requiring human-to-human or human-to-computer interaction. For example, an IoT network may include the logistics vehicle 120, which is equipped with one or more sensors and transmitters in order to process and/or transmit sensor data over the network 135 to the logistics server(s) 105, the storage units 123, and/or the conveyor apparatus. In the context of an IoT network, a computer (not shown) within the logistics vehicle 120 (or any of the other components) can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the logistics server(s) 105) for analysis.

In some embodiments, the local processing device(s) described above is a mesh or other network of microdata centers or edge nodes that process and store local data received from sensors coupled to the storage units 123, conveyor apparatus 125, and/or the logistics vehicle 120 and push or transmit some or all of the data to a cloud device or a corporate data center that is or is included in the one or more logistics server(s) 105. In some embodiments, the local processing device(s) stores all of the data and only transmits selected (e.g., data that meets a threshold) or important data to the one or more logistics server(s) 105. Accordingly, the non-important data or the data that is in a group that does not meet a threshold is not transmitted. For example, the conveyor apparatus 125 may interrogate a tag on a parcel to receive data but only push a portion of the received data. Accordingly, only after the condition or threshold has been met does the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of data (e.g., consolidate entries of purchase orders). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

For example, the storage unit 123 may receive data such as load data 127 from the conveyor apparatus 125 of scans of a barcode on parcels via the network(s) 135. The storage unit 123 may also receive data such as load data 127 from the logistics vehicle 120 which may include a reading of the barcode on a parcel indicating an end node (described herein). Load data 127 and configuration data 129 may be submitted to logistics server(s) 105 via network(s) 135. The logistics server(s) 105 may determine a parcel position error as described herein. The logistics server(s) 105 may communicate the parcel position error to a computing component 110 via the network 135 to cause an action to remedy the parcel position error or to take an action described herein.

1. Exemplary Analysis Computing Entities

FIG. 2 provides a schematic of a logistics server(s) 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, cloud computing nodes, virtual machines, virtual containers, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the logistics server(s) 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the logistics server(s) 105 may include or be in communication with one or more processing elements 205 (also referred to as processors, processing circuitry, and/or similar terms used herein interchangeably) that communicate with other elements within the logistics server(s) 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the logistics server(s) 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store data stores (e.g., parcel/item/shipment data store), data store instances, data store management systems, data, applications, programs, program modules, scripts, source code, object code, byte code, compiled code, interpreted code, machine code, executable instructions, and/or the like. The term data store, data store instance, data store management system, and/or similar terms used herein interchangeably may refer to a collection of records or information/data that is stored in a computer-readable storage medium using one or more data store models, such as a hierarchical data store model, network model, relational model, entity-relationship model, object model, document model, semantic model, graph model, and/or the like.

In particular embodiments, the logistics server(s) 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the data stores, data store instances, data store management systems, data, applications, programs, program modules, scripts, source code, object code, byte code, compiled code, interpreted code, machine code, executable instructions, and/or the like being executed by, for example, the processing element 205. Thus, the data stores, data store instances, data store management systems, data, applications, programs, program modules, scripts, source code, object code, byte code, compiled code, interpreted code, machine code, executable instructions, and/or the like may be used to control certain aspects of the operation of the logistics server(s) 105 with the assistance of the processing element 205 and operating system.

As indicated, in particular embodiments, the logistics server(s) 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the logistics server(s) 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the logistics server(s) 105 may include or be in communication with one or more input elements, such as a keyboard input, a mouse input, a touch screen/display input, motion input, movement input, audio input, pointing device input, joystick input, keypad input, and/or the like. The logistics server(s) 105 may also include or be in communication with one or more output elements (not shown), such as audio output, video output, screen/display output, motion output, movement output, and/or the like.

As will be appreciated, one or more of the logistics server(s)'s 105 components may be located remotely from other logistics server(s) 105 components, such as in a distributed system (e.g., a cloud computing system). Additionally or alternatively, the logistics server(s) 105 may be represented among a plurality of logistics server(s). For example, the logistics server(s) 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the logistics server(s) 105. Thus, the logistics server(s) 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for: reading tag data from a parcel that traverses the conveyor apparatus and transmitting the data, causing automatic rotation of one of the storage units 123 to a loading location, processing one or more shipping requests, monitoring shipments, and/or operation by a user (e.g., a vehicle operator, delivery personnel, customer, and/or the like). In some embodiments, a computing entity 110 is embedded within or otherwise coupled to the storage units 123, the logistics vehicle 120, and/or conveyor apparatus 125 so that these components may perform their suitable functionality as described herein. In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generate various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.).

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the logistics server(s) 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags/readers, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, operators, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provide signals to and receive signals from the transmitter 304 and receiver 306, respectively. In some embodiments, the computing entity 110 includes one or more sensors 330 (e.g., a tag reader). In some embodiments, at least one of the computing entities 110 is coupled to the logistics vehicle 120. The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to detect objects or obtain information in a geographical environment that the logistics vehicle 120 is within.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the logistics server(s) 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the logistics server(s) 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various geolocation technologies including RFID tags, indoor beacons or transmitters, Wi-Fi access points, cellular towers, nearby computing devices/ entities (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the logistics server(s) 105, as described herein. The user input interface can comprise any of a number of devices or interfaces allowing the computing entity 110 to receive information/ data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include a camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers (or Near-Field Communication (NFC) readers), and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store data stores, data store instances, data store management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

In another embodiment, the computing entity 110 may include one or more components or functionality that are the same or similar to those of the logistics server(s) 105, as described in greater detail above. As will be recognized, these architectures and descriptions are provided for exemplary purposes only and are not limiting to the various embodiments.

IV. Exemplary Schematic Diagrams

FIG. 4A is a schematic diagram of an environment 400 illustrating how one or more parcels may interact with various reader components, according to some embodiments. The environment 400 may be a sorting facility as described herein. In some embodiments, the environment 400 alternatively or additionally represents a warehouse facility, another logistics facility (e.g., a logistics store to drop off packages), or any other suitable facility where parcels can be tracked. The environment 400 may include a conveyer apparatus 425 that includes a first reader component 410, a second reader component 420, and a parcel 430. In some embodiments the first reader component 410 and/or second reader component 420 may be integrated with the conveyer apparatus 425. The parcel 430 includes a tag 440 fixed the parcel 430. Referencing FIG. 1, in some embodiments, the conveyor apparatus 425 represents the conveyor apparatus 125 and may be communicatively coupled via the network 135.

The environment 400 illustrates that the conveyer apparatus 425 may shift (also referred to as "move") the parcel 430 from one position in the environment 400 to another while receiving (as illustrated in FIG. 1) load data 127. The conveyer apparatus 425 may automatically facilitate the movement of the parcel 430. In some embodiments, a "conveyor apparatus" as described herein includes any suitable conveyor belt assembly that includes a conveyor belt (continuous medium that carries parcels from one location to another) one or more rollers or idlers that rotate the belt or rotate such that the parcels are moved, and/or one or more pulleys (e.g., located on the ends of the conveyor apparatus 425) that transmit drive power into the belt. A conveyor apparatus, however, need not require a "belt" but can use rollers or other mechanisms to move parcels. The conveyor apparatus 425 may include a rotating component (e.g., a belt or set of rollers) that is configured to cause movement of one or more parcels for loading the one or more parcels. Each time the rotating component causes movement of a parcel 430 past the first reader component 410 or relative to the second reader component 420, the first or second reader component 410 or 420 reads the tag 440 of the parcel 430, which may be then transmitted over a network 135 (as described in FIG. 1).

The first reader component 410 and/or second reader component 420 may identify (also referred to as "read") the tag 440 of the parcel 430 by various methods described herein. As illustrated in FIG. 4A, the reader component 410 may include an optical sensor for reading aspects of the tag 440. For example, the tag 440 may be a barcode. The barcode may include identifying information about the parcel 430, such as the destination, type, and size of the parcel 430. In some embodiments, the second reader component 420 may alternatively or in combination with the first reader component 410 identify the tag 440. The second reader component 420 may be configured to identify the tag 440 using electromagnetic fields to track the tag, such as RFID technology. For example, the tag 440 may include an RFID tag, and the second reader component 420 may identify the tag 440 as the parcel 430 moves along the conveyer apparatus 425.

Although FIG. 4A illustrates the first reader component 410 and the second reader component 420 described above, the first and second reader components 410 and 420 may be described herein with regard to several additional and alternative embodiments. FIG. 4A includes the conveyer apparatus 425, and the first reader component 410 reading the tag 440 of the parcel 430. As illustrated, the first reader component 410 is coupled to or a part of the conveyor apparatus 425, with the first reader component 410 specifically being oriented in a position higher than or above the surface of the conveyor apparatus 425 so that the first reader component 410 can read each tag 440 of each parcel 430. Although the first reader component 410 is illustrated as being attached or a part of the conveyor apparatus 425, it is understood that the first reader component 410 or any other component that reads tags does not have to be attached to a conveyor apparatus 425 and can be oriented in any suitable position (e.g., on a ceiling or be stand-alone) and can take on any suitable form (e.g., a sphere or triangle) or any other configuration besides what is illustrated in FIG. 4A.

The tag 440 may be described with regard to several embodiments. The tag 440 may include information similar to the barcode described above, and/or include identifying information about the parcel 430, such as the destination, type, and size of the parcel 430. The tag 440 may include specific identifiers and values, such as destination (e.g., address where the parcel 430 is delivered to), size (e.g., weight or dimensions), and type (e.g., smalls, drum, box), it is understood that this is representative and that any identifier or values associated with a corresponding parcel 430 can alternatively or additionally be stored to any tag. For example, the tag 440 may alternatively or additionally include other attributes or identifiers, such as: shipper name, fragileness of the parcel 430, the level of security associated with the parcel 430 (e.g., high security parcels 430 may be sorted to a particular logistics vehicle, described below), indications of whether the shipment is expedited, zip code, whether the parcel 430 is domestic or foreign, etc. Some or each of these identifiers can be used to sort the parcel 430 as described herein.

As the first reader component 410 and/or second reader component 420 identify tags such as tag 440 as they move along the conveyer apparats 425, the information received may not only include information from the tag 440, but also include indications of the tag 440 position. The second reader component 420 may receive an indication of the tag 440 position based on a relative location of the second reader component 420 to the tag 440. For example, the second reader component 420 may receive the indication of the tag 440 position based on the signal strength received from the tag 440. In some embodiments, the signal strength may be stronger when received by the second reader component 420 when the tag 440 is closer to the second reader component 440 than when the second reader component 420 is further from the tag 440. The first reader component 410 may receive an indication of the position of the tag 440 based on the view of the tag 440 from the optical sensor (described above). Other methods of receiving an indication of the position of the tag 440 are described herein.

In some embodiments the first reader component 410 or second reader component 420 and tag 440 (or any other reader/tag combination described herein) are RFID, NFC, or any other suitable combination of reader and/or tag devices equipped with antennas and the like. In some embodiments, each tag 440 is passive, active, or semi-passive. Some embodiments of an RFID tag may include an active RFID tag, which comprises at least one of the following: (1) an internal clock; (2) a memory; (3) a microprocessor; and (4) at least one input interface for connecting with sensors located in the first or second reader components 410 and 420. Another embodiment of the RFID tag may be a passive RFID tag. Each RFID tag may communicate wirelessly with RFID interrogators or readers within a certain geographical range or signal strength threshold of each other.

It is understood that in particular embodiments, a "tag" and a "reader" are not limited to RFID, NFC, or similar technologies but may broadly include other embodiments where any data is read from any suitable medium by a computer-readable machine. For example, a "tag" may be or include a paper or other medium that includes a barcode, QR code, data matrix code, smart code, or other code or computer-readable indicia of identifiers. In these embodiments, any suitable associated machine reader can be used to read the code of identifiers, such as an electronic scanner (e.g., a bar code scanner).

FIG. 4B illustrates another schematic diagram of an environment illustrating how one or more positions may be determined. Similar features and components are illustrated to those described in FIG. 4A, but the features and components may be different from or similar to those illustrated in FIG. 4A with regard to several embodiments. In some embodiments, the components of FIG. 4A are included in FIG. 4B. As illustrated, the first reader components 410A and 410B may be located at different locations in a sorting facility such as environment 400. A parcel 430 may be shifted along the conveyer apparatus 425. As the parcel 430 is shifted, the parcel 430 may be sorted along branches of the conveyer apparatus 425. For example, the parcel 430 may be shifted in the direction of the first reader component 410A or 410B. Each branch of the conveyer apparatus 425 may terminate at a different logistics vehicles 450A or 450B.

A set of positions of the tag 440 may be determined by the first reader components 410A and 410B and/or the second reader component 420 as the parcel 430 is shifted along the conveyer apparatus 425. The set of positions may include multiple positions of the tag 440. Each position may be determined using a number of methods. As described herein, the tag 440 may be identified by the first and/or second reader components 410A, 410B, 420 by various methods. In embodiments using the first reader components 410A and 410B, the location of the tag 440 may be determined by an association of the time the tag 440 was identified and/or the static position of the first reader components 410A and 410B. In embodiments using the second reader component 420, the location of the tag 440 may be determined by the relative signal strength of the tag 440 received by the second reader component 420 and/or the known position of the second reader component 420.

In the environment 400, a parcel 430 may have multiple parcel paths, as illustrated in FIG. 4B. A parcel path may be the route a parcel 430 has taken, including a series of positions of the tag. For example, in FIG. 4B there are two parcel paths illustrated. One parcel path may be in the direction of the first reader component 410B and the second parcel path may be in the first reader component 410A. Stated differently, reader components may be present along different parcel paths. Each series of positions of the tag 440 may be associated with a parcel path.

In some embodiments, each parcel path may be defined as a transition of a parcel 430. A transition may be the sequential change in the position of a parcel. As described herein, in some embodiments the position of the parcel may be the location of physical environmental scanners such as the first environmental scanners 410A and 410B. A parcel path may be the transition from one environmental scanner to the next. For example, along a particular parcel path, there may be three environmental scanners—scanner A, B, and C. As the parcel is shifted along a conveyer apparatus, the parcel position may be registered at the location of scanner A, then B, then C. The transition, therefore, is from A to B to C locations. The parcel path, therefore, may also be the transition from location A to B to C.

V. Exemplary Processes

FIG. 5 is an schematic diagram of an example process 500 for determining parcel position errors, according to some embodiments. The process 500 of FIG. 5 may illustrate various process(s) for an environment such as environment 400 illustrated in FIGS. 4A and 4B for a parcel 430 read by a first environmental reader component 410 (or 410A and 410B) and second environmental reader component 420.

FIG. 5 illustrates a data store 540. The data store 540 may be housed in volatile memory and/or non-volatile memory (such as volatile memory 215 and non-volatile memory 210 described in FIG. 2). The data store 540 may include a load data 510 which may be received by environmental sensors described herein. The load data 510 may include a first set of positions of a tag 440, described herein. The data store 540 may include a configuration data 520. The configuration data 520 may include indications of the environmental sensors and the environmental sensor positions and a second set of positions of a tag 440. The configuration data 520 and the load data 510 may be submitted to a logistics server 550 or the logistics server 550 may be in communication with the data store 540. In some embodiments the logistics server may be in communication with the data store over a network (for example, network 135 described in FIG. 1). The logistics server 550 may include a determiner component 560 and an error component 570. In some embodiments, the determiner component 560 and/or error component 570 may include or be in communication with one or more processing elements (such as processing element 205 described in FIG. 2). The determiner component 560 may receive the configuration data 520 and the load data 510. In some embodiments, the determiner component 560 may compare the load data 510 to the configuration data 520 to determine the first set of positions are beyond a threshold from the second set of positions of the tag. Based on the comparison of the determiner component 560, a parcel position error may be determined by the error component 570.

Load data 510 may include data received from the environment 400 from environmental scanners. The load data 510 may include data from scans of a tag 440 on a parcel 430 (described in FIGS. 4A and 4B). In some embodiments, the load data 510 may include the data from a plurality of tags associated with a plurality of parcels. The load data 510 may be organized by any identifier of the tag 440 (described herein), the environmental scanner that identified the tag 440, the time the tag 440 was scanned, or any other means. The load data 510 may be disorganized. In some embodiments, the load data 510 may include a first set of positions of a tag 440 which may be relative to at least one of the plurality of environmental sensors, as described above. For example, with regard to FIGS. 4B and 5, the environmental sensors may be at a plurality of environmental sensor positions, illustrated as first reader component 410A and 410B and second reader component 420 at different locations in the environment 400. As a parcel 430 with a tag 440 is shifted along the conveyer apparatus 425, at least one environmental sensor described may read the tag 440 to submit the read event as load data 510 which may include the relative location of the environmental sensor to the tag 440. For example, the relative location of the tag 440 to the first environmental sensor 410B may be the location of the first environmental sensor when the tag 440 is read. As another example, the relative location of the tag 440 to the second environmental sensor 420 may be based on the signal strength to the tag 440. Additional illustration of each of these embodiments are described herein.

In some embodiments, the load data 510 may be filtered by filtering component 515. In embodiments where the load data 510 comprises a plurality of tags, the filtering component 515 may filter the plurality of tags to identify a single tag. For example, the plurality of tags may be associated with a plurality of identifications of a parcel described above. The filtering component 515 may present only data corresponding to a single identification. The filtered load data 510 may be submitted to the determiner component 560 to replace or in addition to the load data 510 as described herein.

Continuing with FIG. 5, the configuration data 520 may include indications of the plurality of environmental sensors and indications of the environmental sensor positions. The configuration data 520 may include domain knowledge of the environment 400. The domain knowledge may be manually or automatically determined prior to or concurrent with any received load data. For example, the configuration data 520 may include indications of a plurality of environmental sensor positions and indications of the plurality of environmental sensors.

The configuration data 520 may also include other domain knowledge of the environment 400. For example, the configuration data 520 may include the second set of positions of a tag of a plurality of tags associated with a plurality of parcels. Each of the second set of positions may be validated data or reference data. The second set of positions may also be relative to at least one of the plurality of environmental sensors at the plurality of environmental sensor positions.

In embodiments where the load data 510 include the first set of positions of the tag, the first set of positions of the tag may include a series of positions of the tag associated with the first parcel. In this same embodiment, where the configuration data 520 includes the second set of positions of the tag, the second set of positions of the tag may include a series of positions of the tag associated with the plurality of parcels. The series of positions of both the first set of positions and the second set of positions may be a sequential list of positions organized by timestamp for each respective tag. The series of positions may be related to one another, as an organized list of related positional data.

The comparison of the load data 510 to the configuration data 520 by the determiner component 560 may include determining the first set of positions of the tag are beyond the threshold from the second set of positions from the tag. Determining the load data 510 exceeds the threshold may include comparing individual or multiple positions of at least one tag 440 from the load data 510 to the plurality of tags from the configuration data 520. In some embodiments, determining the load data 510 exceeds the threshold may include comparing the associated environmental sensor of the load data 510 to the associated environmental sensor of the configuration data 520. If an individual position of the tag 440 from the load data 510 exceeds the threshold from the configuration data 520, the parcel position error may be determined.

The threshold may be manually, automatically, or individually set by a user or the logistics server 105. The threshold may be a deviation between the first set of positions of the tag and the second set of positions of the tag. The deviation between the first set of positions and second set of positions may be based on time windows. For example, the threshold may be based on a difference in time between a first set of positions and a second set of positions of a plurality of tags at a first environmental sensor. The difference in time may be a time window, where the first and second sets of positions may be historical distributions of the plurality of tags. The threshold, therefore, may be automatically determined based on historical distributions based on the configuration data 520. The threshold may not be only a gap in time, the threshold may be any aspect of data that may be received from the tag, described herein. For example, the first set of positions of the tag may be determined to be beyond the threshold based on a determined missing position by the determiner component 560. The determiner component 560 may compare all positions of the first set of positions to the second set of positions to determine the missing position.

In some embodiments, the determination the first set of positions of the tag are beyond the threshold may further be based on start nodes of the configuration data 520 and load data 510. In some embodiments, the configuration data 520 may include a plurality of configuration start nodes. The configuration start node may define a first initial position of the second set of positions of the tag. In some embodiments, the configuration start node may be a start position of a conveyer apparatus in a sorting facility. For example, the configuration start node may be a location where parcels are loaded onto a conveyer apparatus. A load start node may be determined by a start node determiner 590. The start node determiner 590 may determine a load start node from the load data 510 defining a second initial position of the first set of position of the tag. The start node determiner 590 may receive the load data 510 to determine the load start node. In some embodiments, the load start node may be the first position of the tag in the load data 510.

In some embodiments, the determination the first set of positions of the tag are beyond the threshold may further include, in some embodiments, comparing the plurality of configuration start nodes and the load start node. For example, the determined load start node by the start node determiner 590 may not be the same position or beyond a threshold from the position of any of the configuration start nodes.

In some embodiments, the determination the first set of positions of the tag are beyond the threshold may also or alternatively be based on end nodes of the configuration data 520 and load data 510. In some embodiments, the configuration data 520 may include a plurality of configuration end nodes. The configuration end node may define a first final position of the second set of positions of the tag. In some embodiments, the configuration end node may be an end position of a conveyer apparatus in a sorting facility. For example, the configuration end node may be a position where parcels are loaded onto a logistics vehicle. A load end node may be determined by an end node determiner 595. The end node determiner 595 may determine a load end node from the load data 510 defining a second final position of the first set of positions of the tag. The end node determiner 595 may receive the load data 510 to determine the load end node. In some embodiments, the load end node may be the final position of the tag in the load data 510.

In some embodiments, the determination the first set of positions of the tag are beyond the threshold may further include, in some embodiments, comparing the plurality of configuration end nodes and the load end node. For example, the determined load end node by the end node determiner 595 may not be the same position or beyond a threshold from the position of any of the configuration end nodes.

A parcel position error may be based on the comparison of the load data 510 to the configuration data 520. In some embodiments the parcel position error may be determined by the determiner component 560 and communicated to the error component 570. In some embodiments the error component 570 may determine the parcel position error.

The error component 570 may communicate the parcel position error to a graphical user interface. In some embodiments, parcel position error may cause for display a remedial action. The remedial action may include removing a parcel from the conveyer apparatus, causing to alter or signaling to alter the configuration data 520, or requesting user input to ignore the error. Additional remedial actions contemplated are further described herein and/or may be known by one of ordinary skill in the art.

In some embodiments, the association component 580 may determine an association of the first set of positions of the tag and the second set of positions of the tag of the plurality of tags. For each of the first and second set of tags the association component 580 may also determine at least one of the plurality of environmental sensors at the environmental sensor position of the plurality of environmental sensor positions. The association component 580 may determine for each set of positions of the tag that they share at least one environmental sensor position. In some embodiments, when an association is not determined, error component 570 may communicate the failed association from the association component 580.

FIG. 6 is another schematic diagram of an example process 600 for determining parcel position errors, according to some embodiments. The process 600 of FIG. 6 may, similar to FIG. 5 described above, illustrate various process(es) for an environment such as environment 400 illustrated in FIGS. 4A and 4B for a parcel 430 read by a first environmental reader component 410 (or 410A and 410B) and second environmental reader component 420.

FIG. 6 illustrates data store 640 may include load data 610 and configuration data 620 may be received. The configuration data 620 may include a plurality of parcel paths. The logistics server 650 is also illustrated with a path determiner 690, presentation layer 695, determiner component 660, and an error component 670. The configuration data 620 and the load data 610 may be submitted to the logistics server 650 or the logistics server 650 may be in communication with the data store 640. In some embodiments the logistics server 650 may be in communication with the data store 640 over a network (for example, network 135 described in FIG. 1). In some embodiments, the determiner component 660, path determiner 690, and/or error component 670 may include or be in communication with one or more processing elements (such as processing element 205 described in FIG. 2). The load data 610 may be received by the path determiner 690 to determine a parcel path of a parcel. The determiner component 660 may determine the parcel path exceeds a threshold based on the configuration data 620, which may include a plurality of parcel paths of an environment. The error component 670 may determine a parcel position error based on the determination of the determiner component 660.

Load data 610 may include data similar to the load data 510 described in FIG. 5. The load data 610 may include data from scans of a tag associated with a parcel. In some embodiments the load data 610 may be received from multiple tags associated with multiple parcels.

The configuration data 620 may include indications of the plurality of environmental sensors and indications of the plurality of environmental sensor positions, similar to the data described for configuration data 520. However, the configuration data 620 may alternatively or additionally include a plurality of parcel paths (described above). The configuration data 620 may include domain knowledge, which may include the plurality of parcel paths that may be manually or automatically determined prior to or concurrent with any received load data 610. The plurality of parcel paths of the configuration data 620 may include a plurality of routes. In some embodiments, each of the plurality of parcel paths describe every possible path a parcel may traverse in the environment.

Determining the parcel path of the parcel by the path determiner 690 may include receiving the load data 610. In some embodiments, path determiner 690 may filter the load data 610 for each tag, and organize the filtered data by timestamp, size, or other information received from the scans of the tag. The path determiner 690 may analyze the filtered, organized, and/or raw load data 610 and determine at least one parcel path. For example, in some embodiments, the parcel path may be determined by determining a start node and an end node of a tag from the load data 610 and from the determined start and end nodes, organizing the load data 610 for the tag by sequential position. In some embodiments determining the parcel path may include determining sequential positions of the tag and linking each sequential position to form a path. In some embodiments determining the parcel path may include comparing the load data 610 to the configuration data 620 and the plurality of parcel paths to determine a likely match.

In some embodiments, determining the at least one parcel path may include calculating a time difference between a first position and a second position of the first set of positions of the tag from the load data 610. The first position may be associated with a first environmental sensor of the plurality of environmental sensors and a second position associated with a second environmental sensor of the plurality of environmental sensors. The time difference between the first position and the second position may indicate the parcel path. In some embodiments the configuration data 620 may include a time window for each parcel path of the plurality of parcel paths. The determiner component 660 may compare the time difference between the at least one parcel path and the plurality of parcel paths of the configuration data 620 to determine a parcel path that corresponds to the time difference.

In some embodiments, the configuration data 620 may not be used to determine the at least one parcel path. In some embodiments, the time window for each parcel path may be manually entered. In these embodiments, the determiner component 660 may compare the time difference between the at least one parcel path and the plurality of parcel paths to the manually entered time window to determine a parcel path that corresponds to the manually entered time window.

Determining the at least one parcel path exceeds the threshold may be determined by the determiner component 660. The determiner component 660 may receive the at least one parcel path from the path determiner. The determiner component 660 may also receive the configuration data 620. In some embodiments, the determiner component may determine the at least one path exceeds the threshold, based on the environmental sensor positions, the at least one parcel path, and the plurality of parcel paths.

The threshold in FIG. 6 may be a deviation of the at least one path from the configuration data 620. As described above, the configuration data 620 may include a plurality of parcel paths. The threshold, in some embodiments may be a deviation of the at least one path from the plurality of parcel paths. For example, in some embodiments described above the plurality of parcel paths may be every possible path in an environment. If the at least one path does not match any of the plurality of parcel paths, the determiner component 660 may determine the at least one path exceeds the threshold.

In some embodiments, determining the at least one parcel path exceeds a threshold may comprise a comparison of an average parcel position to the first set of parcel positions. For example, the configuration data 620 may include an average parcel position for each position of the second set of positions for each path of the plurality of paths. The determiner component 660 may determine the parcel path exceeds the threshold by comparing the average parcel position of the configuration data 620 to the first set of parcel positions. As described herein, the at least one parcel path may have an associated first set of positions and the determiner component 660 may determine a position of the first set of positions are beyond any associated average parcel position.

In embodiments where the parcel path is a transition, described above, determining the at least one parcel path exceeds a threshold may include determining an invalid transition. The plurality of parcel paths of the configuration data 620 may include all valid transitions. For example, the plurality of parcel paths may include transitions from A to B to C parcel locations and from A to C to B, these may be valid (also referred to as "legal") transitions. If the load data 610 indicates a transition of a parcel from B to A to C, the transition may be invalid (also referred to as "illegal"). The invalid transition may exceed an exact threshold of only valid transitions of the configuration data 620. As another example, the load data 610 may indicate a transition from A to C without any indication of parcel location B. The transition may be invalid. The invalid transition may exceed the threshold because the transition of the load data 610 is beyond the configuration data 620.

The error component 670 may receive the determination the at least one parcel path exceeds the threshold. In some embodiments, the error component 670 may determine a parcel position error based on determining the at least one parcel path exceeds the threshold. It is contemplated in some embodiments the determiner component 660 may determine the parcel position error.

In some embodiments the error component 670 may submit the parcel position error to a graphical user interface, described herein. In some embodiments, the at least one parcel path may be simultaneously displayed on the graphical user interface or displayed independent from the parcel position error.

In some embodiments, the error component 670 may submit the parcel position error to an amendment component 680. The amendment component 680 may cause the configuration data 620 to include the at least one parcel path based on the parcel position error. It may be advantageous, in some embodiments, to add the at least one parcel path to the configuration data 620. In these described embodiments, the configuration data 620 may include parcel paths that were not previously with the plurality of parcel paths. The amendment component 680 may therefore improve the accuracy of the configuration data 620. In some embodiments the amendment component 680 may be caused to amend the configuration data 620 in response to a user input on a graphical user interface.

In some embodiments, the amendment component 680 may modify the load data 610. In these same embodiments, the error component 670 may submit the parcel position error to the amendment component 680. The amendment component 680 may determine a first position of the first set of positions may correspond to the parcel position error. Stated differently, the amendment component 680 may determine a specific position of the first set of positions that exceeds the threshold. The amendment component 680 may also determine a second position of the second set of positions associated with the first position. Stated differently, the amendment component 680 may determine which position of the second position corresponds to the determined specific position. In some embodiments this determination may be completed by the determiner component 660 or error component 670 when determining if the first set of positions exceed a threshold as described herein. The amendment component 680 may modify the first position to the second position of the load data 610. These embodiments may allow the described systems and methods to ensure the load data accurately reflects the path or position of the parcel, and may account for misreads from the environmental sensors.

In some embodiments, the amendment component 680 may modify the first position to the second position by implementing a queue data structure. In these embodiments, the amendment component 680 may receive the at least one parcel path from the path determiner 690, described herein. The amendment component 680 may generate an empty data structure based on the at least one parcel path. The empty data structure may be sorted by the at least one parcel path's edit distance with the lowest edit distance on top of the resulting data structure. In some embodiments, the data structure may be a measure of difference (or variance) between the at least one parcel path and the configuration data 620. The edit distance may be the summed cost of amendments by the amendment component 680. The data structure may be a queue data structure with the top parcel path with the lowest edit distance from the data structure may be removed from the data structure and stored as a current path in data store 640. If, for each of the at least one parcel path the current path has a comparatively larger edit distance, then the at least one parcel path with the lower edit distance may replace the current path. In some embodiments any corresponding first position of the load data 610 may be replaced by a second position corresponding to the current path by the amendment component 680.

In some embodiments, the amendment component 680 is in communication with the determiner component 660. The amendment component 680 may receive illegal transitions and/or legal transitions, described herein, and compare them to the current path in the data store 640, described above. The amendment component 680 may replace any illegal transitions with legal transitions for the current path. In this way, parcel paths may be amended to replace any erroneous parcel paths with illegal transitions with legal transitions to ensure a legal parcel path.

In some embodiments, the presentation layer 695 receives the determination of the parcel position error based on determining the at least one parcel path exceeds the threshold. The presentation layer 695 may cause to present the parcel position error on a graphical user interface (such as graphical user interface 700 of FIG. 7 described herein). In some embodiments, the presentation layer 695 may cause to present the parcel position error and the at least one parcel path determined by the path determiner 690. In some embodiments, the presentation layer 695 may cause to present only the at least one parcel path.

VI. Exemplary Graphical User Interfaces

FIG. 7 is an schematic diagram of the parcel path on a graphical user interface 700, according to some embodiments. Also displayed is a graphical representation 710 of a plurality of parcel paths, tag identifier 720 which may be a parcel tracking number as illustrated or any other identification of a parcel described above, a first set of positions 730, and package warnings 740. In some embodiments, as illustrated, the graphical representation 710 may be simultaneously displayed with the tag identifier 720, the first set of positions 730, and package warnings 740. In some embodiments, as illustrated, an indication of the customer counter 750 may also be displayed simultaneously or independently of other elements of the graphical user interface 700.

The graphical user interface 700 may be the graphical user interface of a computing device 110 (described in FIG. 1). In some embodiments, the graphical user interface 700 may receive user input via a keyboard and mouse, touch input, or other means. The graphical user interface 700 may be displayed on a screen of the computing device 110, printed, and/or provided by other means.

The graphical representation 710 illustrates a plurality of parcel paths 715A, B, and C. In some embodiments, the graphical representation 710 may include the plurality of parcel paths 715A, 715B, and 715C. As described herein with reference to at-least FIGS. 1 and 6, parcel paths such as the plurality of parcel paths 715A, 715B, and 715C may be determined by logistics server(s) 105 and/or path determiner 690. Each of the plurality of parcel paths 715A, 715B, and 715C may be displayed simultaneously or individually, and in some embodiments additional or fewer parcel paths 715A, 715B, and 715C may be illustrated on graphical representation 710.

The graphical representation 710 may illustrate an environment of a sorting facility, illustrating all possible parcel paths along a conveyer apparatus. Indications of direction 760 of the conveyer apparatus may also be illustrated. Indications of a parcel location 770 may also be illustrated. In some embodiments, the indications of the parcel location 770 may change from a first graphical illustration to a second different graphical illustration to illustrate a parcel position error. For example, an indication of a parcel position error 780 illustrates one graphical illustration of the parcel position error. Each of the indications of direction 760 and parcel location 770 may be illustrated with a graphical representation, such as a graphical representation of direction or location, a popup, a prompt, or a color to visually distinguish the indication from other aspects of the graphical representation 710.

In some embodiments, as described, the parcel location 770 may coincide with or represent the location of an environmental sensor. In embodiments where the environmental sensor is an optical sensor for reading a barcode, for example, each parcel location 770 may indicate the location of an optical sensor.

The embodiment of the graphical representation 710 may provide a user with a holistic representation of parcel position errors, parcel routes, and/or parcel positions.

A first set of positions 730, are also illustrated on the graphical user interface 700. The first set of positions 730 illustrate for the given tag identifier 720, the scan location of the parcel and the timestamp of the scan location.

Package warnings 740 are also illustrated. Package warnings 740 may include or be associated with the parcel position error.

VII. Exemplary Flow Diagrams

FIG. 8 is a flow diagram of an example method 800 of determining a parcel position error, according to some embodiments. The example method 800 may be implemented by the example computing environment 100, described in FIG. 1 described above. The method 800 (and/or any of the functionality described herein (e.g., method 900)) may be performed by processing logic that comprises hardware (e.g., circuitry, dedicated logic, programmable logic, microcode, etc.), software (e.g., instructions run on a processor to perform hardware simulation), firmware, or a combination thereof described in FIGS. 1-3 herein. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing entity 110 having at least one processor and at least one computer readable storage medium), and/or the computer program product as described herein may perform or be caused to perform the method 800 or any other functionality described herein.

At block 810 load data may be received. The load data may be received from a plurality of environmental sensors at a plurality of environmental sensor positions. The load data may include a first set of positions of a tag associated with a first parcel relative to at least one of the plurality of environmental sensors at an environmental sensor position of the plurality of environmental sensor positions. In some embodiments the first set of positions of the tag may coincide with the positions of the environmental sensors. In some embodiments the first set of positions may be relative to the environmental sensors, described herein.

At block 820 configuration data may be received including indications of the plurality of environmental sensors and indications of the plurality of environmental sensor positions. The configuration data may also include a second set of positions of a tag of a plurality of tags associated with a plurality of parcels relative to the at least one of the plurality of environmental sensors at the environmental sensor positions of the plurality of environmental sensor positions.

At block 830, a parcel position error may be determined. The parcel position error may be based on a comparison of the load data and the configuration data. In some embodiments, the comparison may comprise determining the first set of positions of the tag are beyond a threshold from the second set of positions of the tag of the plurality of tags at the at least one of the plurality of environmental sensors at the environmental sensor position of the plurality of environmental sensor positions.

At block 840, indications of the parcel position error is caused to be presented on a graphical user interface (e.g., the graphical user interface 700 as indicated in FIG. 7). For example, in response to the determining of the parcel position per block 830, the error component 670 (described FIG. 6) may communicate (e.g., via an application programming interface (API)) with the presentation layer 695, which structures the data in some way and causes presentation on a user device (e.g., the computing device 110). In some embodiments, the presentation layer 695 is a layer of abstraction that comprises or provides data to one or more applications or services on a user device, across multiple user devices, or in the cloud. For example, in some embodiments, the presentation layer 695 manages the presentation of content to a user across multiple user devices (such as one or more computing entities 110) associated with that user. Based on content logic, device features, and/or other user data, the presentation layer 695 may determine on which user device(s) content is presented or caused to be presented, as well as the context of the presentation, such as how (or in what format and how much content, which can be dependent on the user device or context) it is presented, when it is presented.

In some embodiments, the presentation layer 695 generates graphical representations such as those described with respect to FIG. 7. Such graphical representations can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation layer 695 can present parcel paths 715A, 715B, and 715C as described in FIG. 7.

Alternative or in addition to block 840, particular embodiments may send a control signal to one or more machines, apparatuses, or articles of manufacture to activate or otherwise cause tangible functionality in response to the determining of the parcel position error at block 830. For example, some embodiments can send a control signal instructing a conveyor apparatus to slow down in response to determining that the error is above an error threshold. Alternatively or additionally, some embodiments may send a computer-readable instruction to a device or machine, which instructs and causes it to display a notification or emit an alert (e.g., an auditory alert or visual LED alert) in response to the parcel position error being above a threshold. In some embodiments a computer-readable instruction may be submitted to the conveyer apparatus (such as conveyer apparatus 425 of FIGS. 4A and 4B described in FIG. 4) to sort the parcel onto a particular parcel path or to a holding away from the conveyor apparatus 425.

FIG. 9 is second flow diagram of an example method of determining a parcel position error, according to some embodiments. The example method 900 may be implemented by the example computing environment 100, described in FIG. 1 described above.

At block 910, a load data may be received. The load data may be received from a plurality of environmental sensors at a plurality of environmental sensor positions. The load data may include a first set of positions of a tag associated with a first parcel, each of the positions of the first set of positions may be relative to at least one of the plurality of environmental sensors at the plurality of environmental sensor positions.

At block 920, a configuration data may be received. The configuration data may include indications of the plurality of environmental sensors and indications of the plurality of environmental sensor positions. The configuration data may also include a plurality of parcel paths comprising a route based on a second set of positions of a tag of a plurality of tags associated with a plurality of parcels.

At block 930, at least one parcel path may be determined, the at least one parcel path may be determined from the load data received at block 910. In some embodiments, the at least one parcel path may be determined based on the first set of positions of the tag.

At block 940, at least one parcel path may be determined to exceed a threshold. The at least one parcel path may be determined to exceed a threshold based on the plurality of parcel paths, the at least one parcel path, and the plurality of environmental sensor positions.

At block 950, a parcel position error may be based on determining the at least one parcel path exceeds the threshold.

At block 960, the parcel position error from block 950 may be presented. In some embodiments the parcel position error may be displayed as described in block 840.

FIG. 10 is a third flow diagram of an example method 1000 of determining at least one parcel path, according to some embodiments. The example method 1000 may be implemented by the example computing environment 100, described in FIG. 1 described above.

At block 1010, a load data may be received. The load data may be received from a plurality of environmental sensors at a plurality of environmental sensor positions. The load data may comprise a first set of positions of a tag associated with a first parcel, each of the first set of positions relative to at least one of the plurality of environmental sensors at the plurality of environmental sensor positions.

At block 1020, a load start node may be determined. The load start node may be based on the load data received at block 1010. The load start node may define a first initial position of the first set of positions of the tag.

At block 1030, a first series of positions of a tag may be determined. The first series of positions may comprise an order of the first set of positions of the tag from the determined load start node at block 1020.

At block 1040, at least one parcel path may be determined. The at least one parcel path may comprise a route of the first series of positions of the tag based on the first set of positions of the tag and the load start node.

At block 1050, the at least one parcel path from block 1040 may be caused to be presented. In some embodiments, the presentation layer 695 generates graphical representations such as those described with respect to FIG. 7 of the at least one parcel path. Such graphical representations can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation layer 695 can present parcel paths 715A, 715B, and/or 715C as described in FIG. 7.

Additional embodiments of the present disclosure are contemplated that a person having ordinary skill in the art would recognize:

A computer-implemented method including: receiving a load data from a plurality of environmental sensors at a plurality of environmental sensor positions, the load data comprising a transition of a tag from a first position to a second position; receiving a configuration data comprising a plurality of valid transitions of the tag; and determining a parcel position error based on a comparison of the load data and the configuration data, wherein the comparison comprises determining the transition of the tag does not match the plurality of valid transitions.

An apparatus comprising at least one processor and at least one memory including program code, the at least one memory and the program code configured to, with the processor, cause the apparatus to at least: receive a load data comprising a transition of a tag from a first position relative to a first environmental sensor position to a second position relative to a second environmental sensor position; receive a configuration data comprising a plurality of valid transitions of the tag comprising a plurality of parcel positions relative to a plurality of environmental sensor positions; determine the load data exceeds a threshold based on the transition of the tag and the plurality of valid transitions; and determine a parcel position error based on determining the at least one parcel path exceeds the threshold.

A computer-implemented method comprising: receiving a load data comprising a plurality of transitions of a tag comprising a first set of positions of a tag; determining a load start node defining a first initial position of the first set of positions of the tag; and determine at least one parcel path comprising a route based on the plurality of transitions of the tag and the load start node.

What is claimed is:

1. A computer-implemented method comprising:
   receiving a load data from a plurality of environmental sensors at a plurality of environmental sensor positions, the load data comprising a first set of positions of a tag associated with a first parcel relative to at least one of the plurality of environmental sensors at an environmental sensor position of the plurality of environmental sensor positions;
   receiving a configuration data comprising indications of the plurality of environmental sensors and indications of the plurality of environmental sensor positions and a second set of positions of a tag of a plurality of tags associated with a plurality of parcels relative to the at least one of the plurality of environmental sensors at the environmental sensor position of the plurality of environmental sensor positions;
   determining a parcel position error based on a comparison of the load data and the configuration data, wherein the comparison comprises determining the first set of positions of the tag are beyond a threshold from the second set of positions of the tag of the plurality of tags at the at least one of the plurality of environmental sensors at the environmental sensor position of the plurality of environmental sensor positions; and
   determining an association of the first set of positions of the tag and the second set of positions of the tag of the plurality of tags, and for each of the first and second set of tags determining an at least one of the plurality of environmental sensors at the environmental sensor position of the plurality of environmental sensor positions.

2. The method of claim 1, wherein the first set of positions of the tag comprises a series of positions of the tag associated with the first parcel, and wherein the second set of positions of the tag comprises a series of positions of the tag associated with the plurality of parcels.

3. The method of claim 1, wherein the configuration data further comprises a plurality of configuration start nodes, each configuration start node defining a first initial position of the second set of positions of the tag; and
   wherein the method further comprises:
   determining a load start node from the load data defining a second initial position of the first set of positions of the tag; and
   wherein determining the first set of positions of the tag are beyond the threshold further comprises comparing the plurality of configuration start nodes and the load start node.

4. The method of claim 1, wherein the configuration data further comprises a plurality of configuration end nodes, each configuration end node defining a first final position of the second set of positions of the tag of the plurality of tags; and
   wherein the method further comprises:
   determining a load end node from the load data defining a second final position of the first set of positions of the tag; and
   wherein determining the first set of positions of the tag are beyond the threshold further comprises comparing the plurality of first end nodes to the load end node.

5. The method of claim 1, wherein determining the first set of positions of the tag are beyond the threshold comprises determining a missing position for a position of the first set of positions of the tag compared to the second set of positions of the tag of the plurality of tags.

6. The method of claim 1, wherein the load data further comprises a plurality of parcel IDs; and
   wherein the method further comprises:
   filtering the load data to comprise a single parcel ID corresponding to the tag.

7. The method of claim 1, further comprising causing for display on the graphical user interface a remedial action comprising the parcel position error.

8. The method of claim 1, wherein the first set of positions of the tag comprise a first scan event data of the tag, the first scan event data at the at least one of the plurality of environmental sensor positions; and
   wherein the second set of positions of the tag comprise a second scan event data of each tag of the second plurality of tags, the second scan event data at the at least one of the plurality of environmental sensor positions.

9. An apparatus comprising at least one processor and at least one memory including program code, the at least one memory and the program code configured to, with the processor, cause the apparatus to at least:
   receive a load data from a plurality of environmental sensors at a plurality of environmental sensor positions the load data comprising a first set of positions of a tag associated with a first parcel, each of the positions of the first set of positions relative to at least one of the plurality of environmental sensors at the plurality of environmental sensor positions;
   receive a configuration data comprising indications of the plurality of environmental sensors and indications of the plurality of environmental sensor positions, and a plurality of parcel paths comprising a route based on a second set of positions of a tag of a plurality of tags associated with a plurality of parcels;

determine at least one parcel path comprising a route of the parcel based on the first set of positions of the tag;

determine the at least one parcel path exceeds a threshold based on the plurality of parcel paths, the at least one parcel path, and the plurality of environmental sensor positions;

determine a parcel position error based on determining the at least one parcel path exceeds the threshold; and generate for display on a graphical user interface the at least one parcel path simultaneously with the at least one parcel position error.

10. The apparatus of claim 9, wherein determining the at least one parcel path exceeds the threshold may comprise a comparison of the plurality of parcel paths to the at least one parcel path.

11. The apparatus of claim 9, wherein determining the at least one parcel path comprises calculating a time difference between a first position and a second position of the first set of positions of a tag, the first position associated with a first environmental sensor of the plurality of environmental sensors and a second position associated with a second environmental sensor of the plurality of environmental sensors.

12. The apparatus of claim 11, wherein the plurality of parcel paths further comprise a time window for each parcel path of the plurality of parcel paths for each of the plurality of parcels at the first position and the second position; and
wherein determining the at least one parcel path exceeds the threshold further comprises a comparison of the time difference to the time window.

13. The apparatus of claim 9, wherein each path of the plurality of parcel paths further comprise an average parcel position for each position of the second set of positions for each path of the plurality of paths;
wherein determining the parcel path exceeds the threshold comprises a comparison of the average parcel position to the first set of positions.

14. The apparatus of claim 9, wherein the apparatus is further caused to at least:
modifying the configuration data to include the at least one parcel path based on determining the parcel position error.

15. The apparatus of claim 9, wherein the apparatus is further caused to at least:
determine a first position of the first set of positions corresponding to the parcel position error;
determine a second position of the second set of positions associated with the first position; and
modify the first position to the second position.

16. A computer-implemented method comprising:
receiving a load data from a plurality of environmental sensors at a plurality of environmental sensor positions, the load data comprising a first set of positions of a tag associated with a first parcel, each of the first set of positions relative to at least one of the plurality of environmental sensors at the plurality of environmental sensor positions;
determining a load start node defining a first initial position of the first set of positions of the tag;
determining a first series of positions of the tag comprising an order of the first set of positions of the tag from the determined load start node; and
determining at least one parcel path comprising a route of the first series of positions of the tag based on the first set of positions of the tag and the load start node.

17. The computer-implemented method of claim 16, further comprising:
receiving a configuration data comprising indications of the plurality of environmental sensors and indications of the plurality of environmental sensor positions, and a plurality of parcel paths comprising a route based on a second series of positions of a tag of a plurality of tags associated with a plurality of parcels, each path of the plurality of parcel paths comprising an average parcel position for each position of the second series of positions for each path of the plurality of parcel paths;
determining the at least one parcel path exceeds a threshold based on a comparison of the average parcel position to the first series of positions; and
modifying the load data to replace a position of the first series of positions associated with the at least one parcel path with an associated average parcel position of the second series of positions.

18. The computer-implemented method of claim 17, wherein the method further comprises:
determining a plurality of configuration start nodes from the configuration data defining a initial position of the second set of positions of the tag; and
wherein determining the at least one parcel path comprising the route of the first series of positions of the tag is further based on the plurality of configuration start nodes.

* * * * *